(12) United States Patent
Derby

(10) Patent No.: US 7,448,193 B2
(45) Date of Patent: Nov. 11, 2008

(54) REEL LOCATING SYSTEM FOR LAWNMOWER

(75) Inventor: Harry L. Derby, Charlotte, NC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/877,248

(22) Filed: Oct. 23, 2007

(65) Prior Publication Data

US 2008/0092505 A1      Apr. 24, 2008

Related U.S. Application Data

(60) Provisional application No. 60/862,492, filed on Oct. 23, 2006.

(51) Int. Cl.
    *A01D 34/53* (2006.01)
(52) U.S. Cl. ........................................... 56/249; 56/294
(58) Field of Classification Search ................... 56/249, 56/294, 7, 156, 198, 231, DIG. 20
    See application file for complete search history.

(56) References Cited

U.S. PATENT DOCUMENTS

| | | | | |
|---|---|---|---|---|
| 4,680,922 A | * | 7/1987 | Arnold | ............................. 56/7 |
| 5,553,380 A | * | 9/1996 | Rice | ............................ 29/895.2 |
| 6,622,464 B2 | * | 9/2003 | Goman et al. | ................. 56/16.9 |
| 7,114,318 B2 | * | 10/2006 | Poulson et al. | ................. 56/249 |
| 7,121,073 B2 | * | 10/2006 | Schmidt et al. | ............... 56/249 |
| 7,191,584 B2 | * | 3/2007 | Goman et al. | .................. 56/249 |
| 2004/0221564 A1 | * | 11/2004 | Jager | ........................... 56/249 |

* cited by examiner

*Primary Examiner*—Árpád Fábián-Kovács
(74) *Attorney, Agent, or Firm*—Harness, Dickey & Pierce, P.L.C.

(57) ABSTRACT

A mower includes a mower base unit and a cutting reel assembly having a plurality of cutting blades rotatable about an axis extending substantially parallel to the ground. The mower also includes at least one leading link pivotally interconnecting the cutting reel assembly and the mower base unit such that the cutting reel moves independently relative to the mower base unit as the cutting reel assembly traverses undulating terrain. Furthermore, the mower includes at least one tracking rod interconnecting the mower base unit and the cutting reel assembly. The tracking rod is configured to cause the cutting reel assembly to track in a substantially straight line along a mowing direction while reducing lateral movement of the cutting reel assembly relative to the mower base unit.

23 Claims, 3 Drawing Sheets

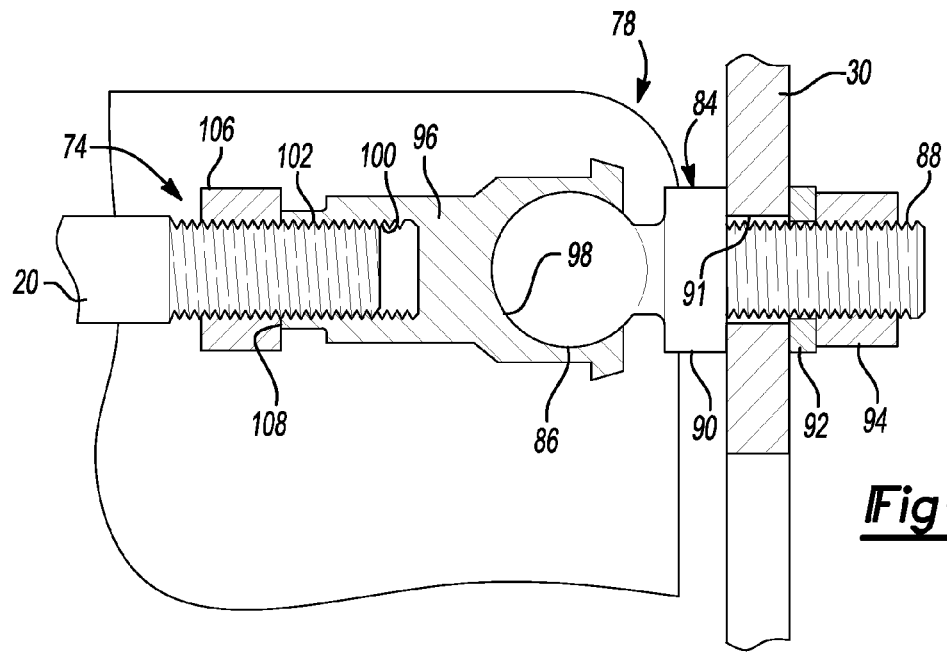
_Fig-3_
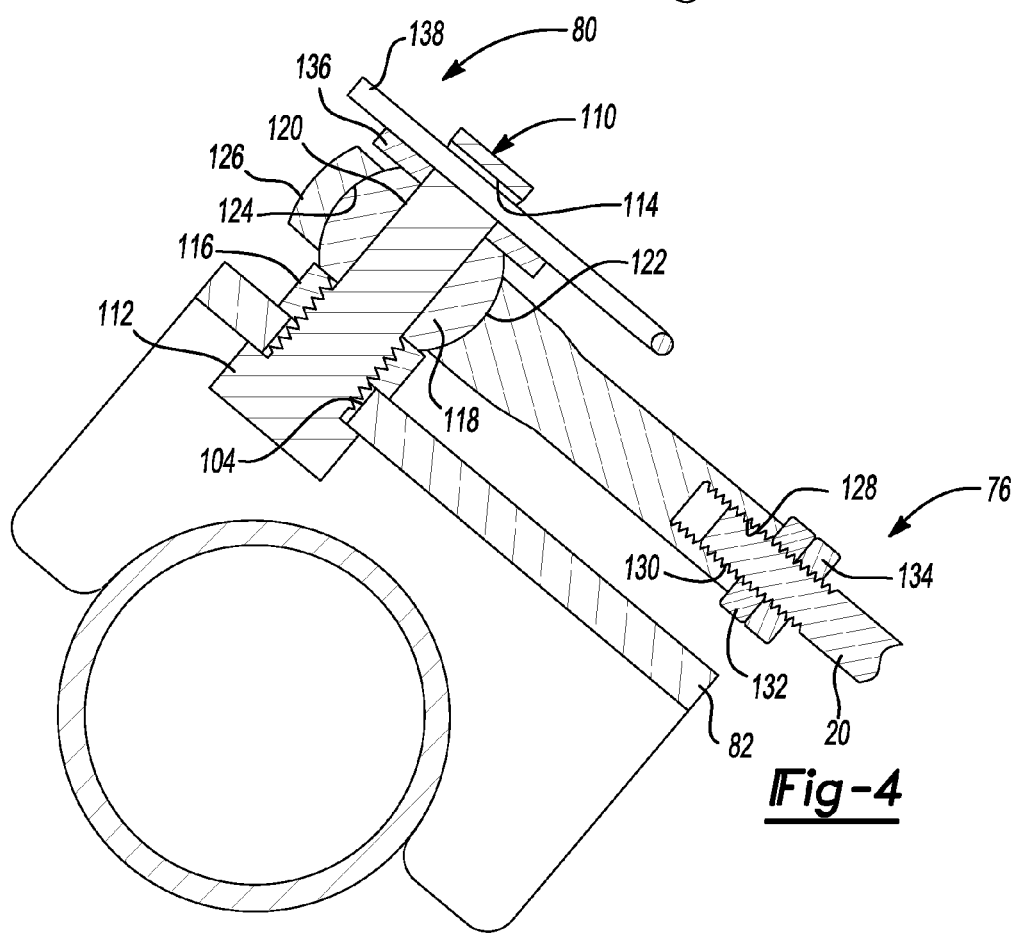
_Fig-4_

REEL LOCATING SYSTEM FOR LAWNMOWER

CROSS REFERENCE TO RELATED APPLICATION

This application claims the benefit of U.S. Provisional Application No. 60/862,492, filed on Oct. 23, 2006, the disclosure of which is incorporated herein by reference.

FIELD

The present disclosure relates to a lawnmower assembly. More particularly, the present disclosure relates to a locating system for a rotating reel of a lawnmower assembly.

BACKGROUND

The statements in this section merely provide background information related to the present disclosure and may not constitute prior art.

In an attempt to provide a fine cutting mower, manufacturers have provided mowers including a mower base unit and an independent moveable cutting unit. The moveable cutting unit independently follows contours of an underlying terrain to mow without scalping the turf. The cutting unit is typically either towed or pushed by the mower base unit. While use of the independent cutting unit has minimized turf scalping, the pushing and towing methods generally allow excessive lateral movement of the cutting unit relative to the base mower unit while traveling in a forward direction. A lawnmower operator may be unable to control the cutting unit to track in a straight line as the cutting unit follows the ground contour. Unsightly cutting patterns and portions of uncut grass may result.

Therefore, a need exists for a lawnmower having a mower base unit and an independent cutting unit operable to follow undulating terrain while preventing binding motions and minimizing lateral movement such that the cutting unit travels along a substantially straight line.

SUMMARY

A mower is disclosed that includes a mower base unit and a cutting reel assembly having a plurality of cutting blades rotatable about an axis extending substantially parallel to the ground. The mower also includes at least one leading link pivotally interconnecting the cutting reel assembly and the mower base unit such that the cutting reel moves independently relative to the mower base unit as the cutting reel assembly traverses undulating terrain. Furthermore, the mower includes at least one tracking rod interconnecting the mower base unit and the cutting reel assembly. The tracking rod is configured to cause the cutting reel assembly to track in a substantially straight line along a mowing direction while reducing lateral movement of the cutting reel assembly relative to the mower base unit.

In another aspect, a mower is disclosed that includes a mower base unit having a rotatable ground engaging traction member for movement of the mower along a ground in a mowing direction of movement. The mower also includes a cutting reel assembly having a frame rotatably supporting a front roller, a rear roller and a reel of cutting blades therebetween. Furthermore, the mower includes a first and second leading link interconnecting the cutting reel assembly and the mower base unit to drive the cutting reel assembly while allowing relative movement between the mower base unit and the cutting reel assembly as the cutting reel assembly follows undulating terrain. Moreover, the mower includes a tracking rod interconnecting the mower base unit and the cutting reel assembly and extending substantially transversely across the mower to cause the cutting reel assembly to track in a substantially straight line along the mowing direction of movement.

In still another aspect, a mower is disclosed that includes a mower base unit having a rotatable ground engaging traction member for movement of the mower along a ground in a mowing direction of movement. The mower also includes a cutting reel assembly having a plurality of cutting blades rotatable about an axis extending substantially parallel to the ground. The mower further includes at least one leading link pivotally interconnecting the cutting reel assembly and the mower base unit such that the cutting reel moves independently relative to the mower base unit as the cutting reel assembly traverses undulating terrain. The leading link is configured to limit fore-aft movement of the cutting reel assembly relative to the mower base unit as the cutting reel assembly travels in the mowing direction of movement along undulating terrain, and the leading link is further configured to limit rotational movement about the mowing direction of the cutting reel assembly relative to the mower base unit. Additionally, the mower includes a tracking rod having an adjustable length. The tracking rod extends substantially parallel to the ground, and the tracking rod extending across approximately the entire width of the mower base unit so as to interconnect the mower base unit and the cutting reel assembly. The tracking rod is configured to cause the cutting reel assembly to track in a substantially straight line along the mowing direction of movement while reducing lateral movement of the cutting reel assembly relative to the mower base unit. Each end of the tracking rod is coupled to one of the mower base unit and the cutting reel assembly with a spherical joint.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a fragmentary cross-sectional view taken along line 3-3 shown in FIG. 2; and FIG. 4 is a fragmentary cross-sectional view taken along line 4-4 shown in FIG. 2.

DETAILED DESCRIPTION

The following description is merely exemplary in nature and is not intended to limit the present disclosure, application, or uses.

Figure 1:
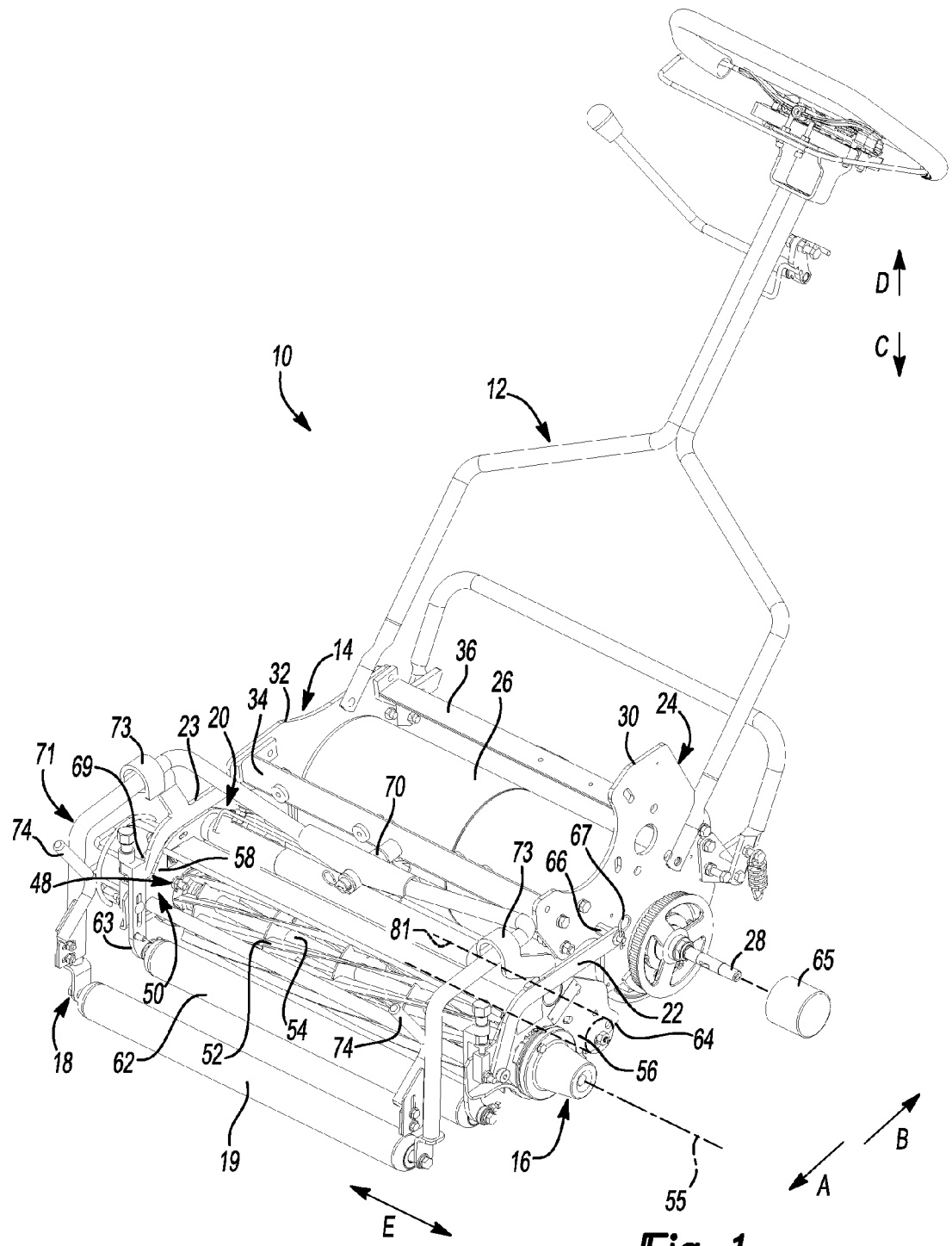
FIG. 1 is a perspective view of a reel mower in accordance with the present disclosure.
Figure 2:
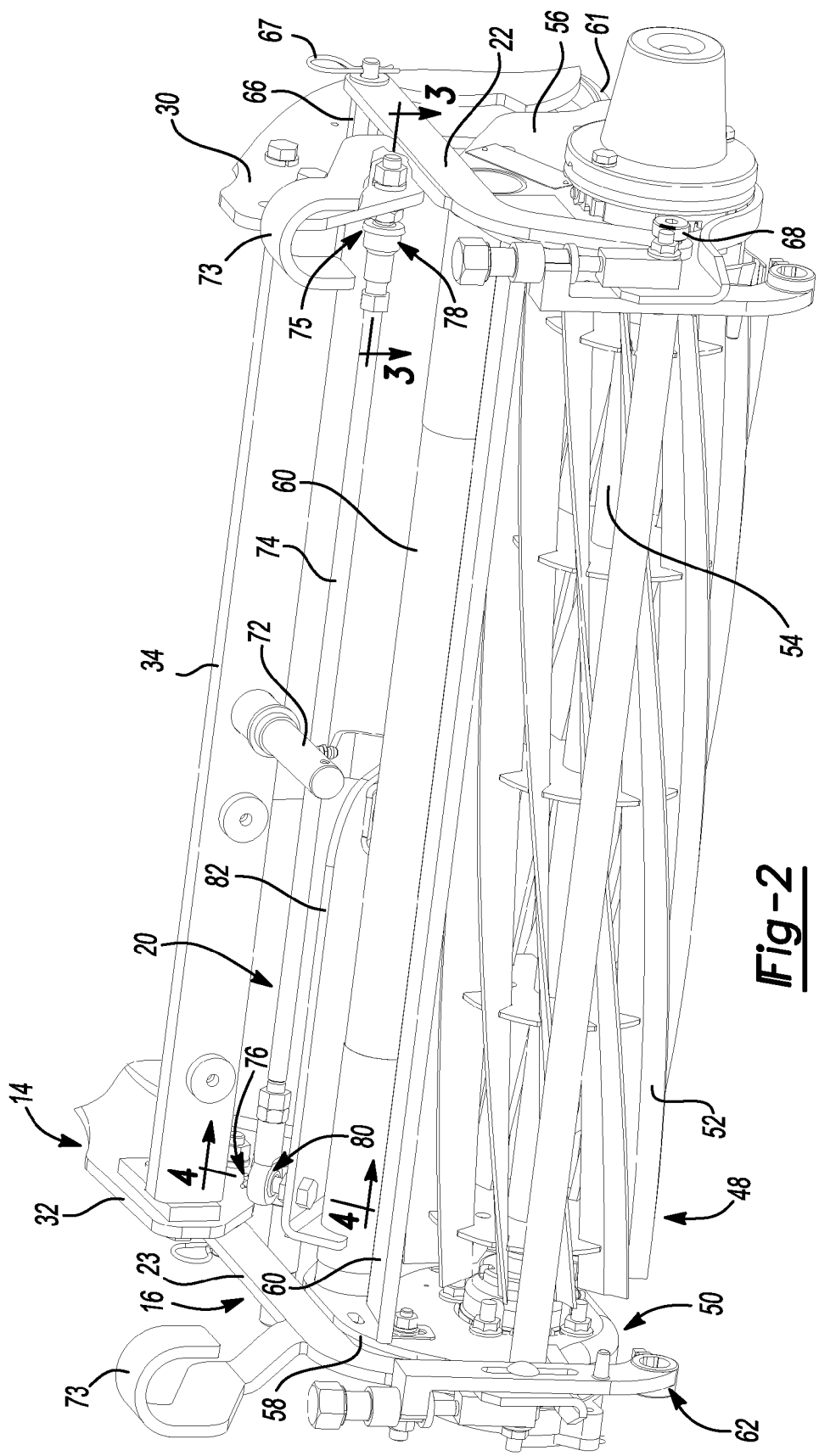
FIG. 2 is an enlarged fragmentary perspective view of the mower.

For exemplary purposes, FIGS. 1 and 2 show a fine cutting mower 10. Although the mower 10 discloses a walk-behind mower, the mower 10 may also comprise a riding mower including all or a subset of the various ancillary features described herein. The mower 10 includes a handle assembly 12, a mower base unit 14, an independent cutting reel unit or assembly 16, a lifting assembly 18, at least one tracking rod 20 and a pair of leading arms or links 22, 23. The handle assembly 12 is coupled to the mower base unit 14. The tracking rod 20 interconnects the mower base unit 14 and the independent cutting reel assembly 16. Additionally, the pair of leading links 22, 23 couple the mower base unit 14 to the cutting reel assembly 16. The lifting assembly 18 is mounted to the mower base unit 14. A front roller 19 is rotatably mounted to the lifting assembly 18.

Referring to FIG. 1, the handle assembly 12 allows a user to direct the mower 10 from behind in a mowing direction of movement, such as a forward operation direction, as indicated by arrow A, or a backward operation direction, as indicated by arrow B, on the ground. The user may also push the handle assembly 12 in a downward direction, a direction indicated by arrow C, to lift the cutting reel assembly 16 in an upward direction, indicated by arrow D, such that the cutting reel assembly 16 does not contact the ground.

The mower base unit 14 supports the mower 10 on the ground such that the mower 10 may traverse along the ground in the mowing direction of movement. The mower base unit 14 includes a frame structure 24 and a drive roller 26. The handle assembly 12 is coupled to the frame structure 24. The drive roller 26 is rotatably mounted to the frame structure 24 via a roller axle 28.

The frame structure 24 supports and guides the drive roller 26 along the ground. The frame structure 24 includes a first side plate 30, a second side plate 32, a first crossmember 34 and a second crossmember 36. The first crossmember 34 and the second crossmember 36 interconnect the first side plate 30 and the second side plate 32. In various embodiments, the drive roller 26 supports the mower 10 on the ground and serves as a traction drive for the mower 10.

The cutting reel assembly 16 includes a greensmower reel 48 rotatably mounted within a reel frame structure 50. The rotatable greensmower reel 48 includes helical blades 52 equally spaced around a reel shaft 54. Greensmower reel 48 is rotatable about an axis 55 extending longitudinally through the reel shaft 54.

The reel frame structure 50 supports the greensmower reel 48 as the mower 10 traverses along the ground. The reel frame structure 50 includes a first plate 56, a second plate 58 and cross-frame pieces 60. The first plate 56 and the second plate 58 extend parallel to one another along each side of the greensmower reel 48 on the reel shaft 54. A bedknife 61 is also fixed to each of the first plate 56 and the second plate 58. The blades 52 rotate about axis 55 and move in close proximity past the bedknife to perform the grass cutting function.

The cutting reel assembly 16 also includes a rotatable front roller 62 mounted at a leading edge 63 of the cutting reel assembly 16. A rotatable rear roller 81 is mounted along a trailing edge 64 of the cutting reel assembly 16. The front and rear rollers 62, 81 are provided between the front roller 19 and the drive roller 26. The front and rear rollers 62, 81 support the cutting reel assembly 16 for movement relative to the ground as will be discussed in greater detail below.

The mower 10 may include a conventional electrical system (not shown) having a first electrical motor 65 drivingly engaging the roller axle 28 for rotating the drive roller 26 and moving the mower 10 relative to the ground. The electric motor 65 may also be drivingly coupled to the reel shaft 54 for rotating the greensmower reel 48. In the embodiment shown, a second electric motor 69 is drivingly coupled to the reel shaft 54 for rotating the greensmower reel 48 independent of the first electrical motor 65. Rotation of the greensmower reel 48 and the drive roller 26 may be separately controlled.

Leading links 22, 23 interconnect reel frame structure 50 of the cutting reel assembly 16 and the mower base unit 14. The leading links 22 limit longitudinal movements or binding motions (e.g., movements in the direction of mowing or rotation about the direction of mowing) of the cutting reel assembly 16 relative to the mower base unit 14 as the mower 10 follows undulating terrain. Because the leading link 22 is substantially similar to the leading link 23, only leading link 22 will be described in detail. One end of leading link 22 is pivotally supported on a pin 66 fixed to first side plate 30. A clip 67 is coupled to pin 66 to retain leading link 22 on pin 66. A second end of leading link 22 is pivotally coupled to first plate 56 of reel frame structure 50 by a fastener 68. Clearance exists between fastener 68 and leading link 22 to allow relative rotation between leading link 22 and first plate 56.

Lifting assembly 18 is coupled to the first crossmember 34 of the frame structure 24. The lifting assembly 18 aids in lifting the mower 10, such as when loading or unloading the mower from a trailer or a truck bed. The lifting assembly 18 includes a sleeve 70 fixed to a lift frame 71. The sleeve 70 is rotatably supported on a pin 72 fixed to and extending from the first crossmember 34. The sleeve 70 couples the lifting assembly 18 to the mower base unit 14 and supports the front roller assembly. The lift frame 71 of the lifting assembly 18 is positioned within a pocket defined by lifting cuffs 73 fixed to leading links 22. The lift frame 71 is typically spaced apart from lifting cuffs 73 when the mower 10 is resting on the ground. The lift frame 71 engages the lifting cuffs 73 when an operator attempts to lift mower 10 off of the ground by grasping handle assembly 12 and lower handles 74 fixed to lift frame 71.

During mowing operation, the front and rear rollers 62, 81 supporting the cutting reel assembly 16 follow the curvature of the terrain to thereby allow movement of the cutting reel assembly 16 relative to the mower base unit 14. For instance, when the mower moves toward terrain that slopes upward or downward, the front and rear rollers 62, 81 pivots the reel assembly 16 relative to the mower base unit 14 to reduce turf scalping and/or produce a more even cut. Meanwhile, the leading links 22, 23 limit binding motions (e.g., movements in the direction of mowing or rotation about the direction of mowing) of the cutting reel assembly 16 relative to the mower base unit 14 as the mower 10 follows this undulating terrain.

FIGS. 2 and 3 depict the tracking rod 20 maintaining proper lateral position of the cutting reel assembly 16 to track in a substantially straight line. While the leading links 22 prevent the cutting reel assembly from moving in the fore and aft directions, the tracking rod minimizes lateral, or side to side movement, as indicated by arrow E. The tracking rod 20 extends a predetermined length equal to approximately the width of the cutting reel assembly 16 and extends transversely substantially parallel to the ground. The length of the tracking rod 20 is maximized in order to minimize lateral movement of the cutting reel assembly 16. If the length of the tracking rod 20 is too short, excessive lateral movement between the cutting reel assembly 16 and the mower base unit 14 may be allowed.

The tracking rod 20 includes a rigid bar having a first end 75 pivotally coupled to mower base unit 14 and a second end 76 pivotally coupled to reel frame structure 50. This arrangement limits the relative movement between cutting reel assembly 16 and mower base unit 14 causing the cutting reel assembly 16 to track along the ground in a substantially straight line along the mowing direction of movement. A spherical bearing 78 interconnects first end 75 and first side plate 30. A spherical bearing 80 interconnects second end 76 and a plate 82 fixed to reel frame structure 50.

FIG. 3 depicts spherical bearing 78 including a ball stud 84 having a ball 86 at one end and a threaded shank 88 at an opposite end. A shoulder 90 is positioned between the two ends of ball stud 84. Threaded shank 88 extends through an aperture 91 formed in first side plate 30. A washer 92 and a nut 94 fix ball stud 84 to first side plate 30. A socket 96 includes a ball seat 98 in receipt of ball 86. Socket 96 also includes an internally threaded blind bore 100 in receipt of an externally threaded portion 102 of first end 75. The effective length of tracking rod 20 may be adjusted by varying the length of engagement between external thread 102 and internally threaded bore 100. Accordingly, a manufacturer of mower 10 may account for variation in the exact position of first side plate 30 relative to an aperture 104 extending through plate 82 in a relatively simple manner. Once the proper length of tracking rod 20 has been set, a jam nut 106 is threadingly engaged with external thread 102 and tightened against an end surface 108 of socket 96. Relative movement between tracking rod 20 and socket 96 is now restricted.

FIG. 4 depicts spherical bearing 80 including a threaded fastener 110 having an enlarged head 112 at one end and a transversely extending aperture 114 at the opposite end. A nut 116 threadingly engages fastener 110 to fix the fastener to plate 82. A bushing 118 is supported on a cylindrical shaft portion 120 of fastener 110. Bushing 118 includes a substantially spherically shaped outer surface 122 in sliding engagement with a spherically shaped pocket 124 formed in a socket 126. Socket 126 also includes a threaded bore 128 in receipt of an externally threaded portion 130 of second end 76. A pair of jam nuts 132 and 134 fix tracking rod 20 to socket 126. A washer 136 abuts bushing 118. A retaining ring 138 extends through transverse aperture 114 to retain spherical bearing 80 in its proper position. One skilled in the art will appreciate that both spherical bearing 78 and spherical bearing 80 allow three dimensional movement of tracking rod 20 relative to threaded fastener 110 and ball stud 84. By providing relatively restricted freedom between cutting reel assembly 16 and mower base unit 14, cutting reel assembly 16 is allowed to follow undulating terrain but is forced to maintain the desired lateral alignment with mower base unit 14.

The mower 10 disclosed herein advantageously prevents binding motions of the cutting reel assembly 16 via use of the pair of leading links 22, 23 to couple the mower base unit 14 and the cutting reel assembly 16. The tracking rod 20 is also used to interconnect the mower base unit 14 and the independent cutting reel assembly 16 in order for the cutting reel assembly 16 to track in a straight line along the mowing direction of movement relative to the mower base unit 14. It will be appreciated that the mower 10 could include multiple tracking rods 20 for tracking the cutting reel assembly 16 in a straight line along the mowing direction of movement relative to the mower base unit. It will further be appreciated that the reel assembly described herein may, in various embodiments, be configured as a floating head assembly.

The disclosure has been described in an illustrative manner. It is to be understood that the terminology which has been used is intended to be in the nature of words of description rather than of limitation. Many modifications and variations are possible in light of the above teachings. Therefore, within the scope of the appended claims, the disclosure may be practiced other than as specifically described.

What is claimed is:

1. A mower comprising:
   a mower base unit;
   a cutting reel assembly having a plurality of cutting blades rotatable about an axis extending substantially parallel to the ground;
   at least one leading link pivotally interconnecting the cutting reel assembly and the mower base unit such that the cutting reel moves independently relative to the mower base unit as the cutting reel assembly traverses undulating terrain; and
   at least one tracking rod interconnecting the mower base unit and the cutting reel assembly and being configured to cause the cutting reel assembly to track in a substantially straight line along a mowing direction while reducing lateral movement of the cutting reel assembly relative to the mower base unit.

2. The mower of claim 1, wherein the at least one tracking rod extends substantially parallel to the ground.

3. The mower of claim 1, wherein one end of the at least one tracking rod is coupled to one of the mower base unit and the cutting reel assembly with a spherical joint.

4. The mower of claim 3, wherein the spherical joint includes a socket having a spherically-shaped seat in receipt of a bushing having a substantially spherically-shaped outer surface.

5. The mower of claim 4, wherein said socket includes a threaded bore in receipt of a threaded end of the at least one tracking rod.

6. The mower of claim 5, further including a fastener extending substantially perpendicularly to the at least one tracking rod and interconnecting the socket and the one of the mower base unit and the cutting reel assembly.

7. The mower of claim 3, wherein the other end of the at least one tracking rod is coupled to the other of the mower base unit and the cutting reel assembly by another spherical joint.

8. The mower of claim 3, wherein the spherical joint includes a ball stud having one end fixed to the mower base unit and an opposite end having a ball portion received within a spherically-shaped seat of a socket, the socket being threadingly coupled to the at least one tracking rod.

9. The mower of claim 1, wherein the at least one leading link is configured to limit fore-aft movement of the cutting reel assembly relative to the mower base unit as the cutting reel assembly travels in the mowing direction along undulating terrain.

10. The mower of claim 1, wherein the at least one leading link is configured to limit rotational movement about the mowing direction of the cutting reel assembly relative to the mower base unit.

11. The mower of claim 1, wherein the at least one tracking rod extends across approximately the entire width of the mower base unit.

12. The mower of claim 1, wherein one end of the at least one tracking rod is coupled to one side of the mower base unit, the other end of the at least one tracking rod being coupled to the cutting reel assembly near an opposite side of the mower base unit.

13. The mower of claim 1, wherein the length of the at least one tracking rod is adjustable.

14. The mower of claim 13, wherein the at least one tracking rod includes a threaded portion engaging a threaded socket, wherein relative rotation between the threaded portion and the threaded socket allows the at least one tracking rod to be adjustable.

15. The mower of claim 1, wherein the mower base unit includes a rotatable ground engaging traction member for movement of the mower along a ground in the mowing direction.

16. A mower comprising:
   a mower base unit having a rotatable ground engaging traction member for movement of the mower along a ground in a mowing direction of movement;

a cutting reel assembly having a frame rotatably supporting a front roller, a rear roller and a reel of cutting blades therebetween;

a first and second leading link interconnecting the cutting reel assembly and the mower base unit to drive the cutting reel assembly while allowing relative movement between the mower base unit and the cutting reel assembly as the cutting reel assembly follows undulating terrain; and a tracking rod interconnecting the mower base unit and the cutting reel assembly and extending substantially transversely across the mower to cause the cutting reel assembly to track in a substantially straight line along the mowing direction of movement.

17. The mower of claim 16, wherein one end of the tracking rod is coupled to one of the mower base unit and the cutting reel assembly with a spherical joint.

18. The mower of claim 17, wherein the tracking rod extends across approximately the entire width of the mower base unit.

19. The mower of claim 18, wherein the length of the tracking rod is adjustable.

20. The mower of claim 19, wherein the other end of the tracking rod is coupled to the other of the mower base unit and the cutting reel assembly by another spherical joint.

21. The mower of claim 20, further including an electric motor selectively driving the traction member.

22. The mower of claim 20, further including an electric motor selectively driving the reel of cutting blades.

23. A mower comprising:

a mower base unit having a rotatable ground engaging traction member for movement of the mower along a ground in a mowing direction of movement;

a cutting reel assembly having a plurality of cutting blades rotatable about an axis extending substantially parallel to the ground;

at least one leading link pivotally interconnecting the cutting reel assembly and the mower base unit such that the cutting reel moves independently relative to the mower base unit as the cutting reel assembly traverses undulating terrain, the at least one leading link configured to limit fore-aft movement of the cutting reel assembly relative to the mower base unit as the cutting reel assembly travels in the mowing direction of movement along undulating terrain, the at least one leading link further configured to limit rotational movement about the mowing direction of the cutting reel assembly relative to the mower base unit; and a tracking rod having an adjustable length, the tracking rod extending substantially parallel to the ground, the tracking rod extending across approximately the entire width of the mower base unit so as to interconnect the mower base unit and the cutting reel assembly, and being configured to cause the cutting reel assembly to track in a substantially straight line along the mowing direction of movement while reducing lateral movement of the cutting reel assembly relative to the mower base unit, wherein each end of the tracking rod is coupled to one of the mower base unit and the cutting reel assembly with a spherical joint.

* * * * *

UNITED STATES PATENT AND TRADEMARK OFFICE
CERTIFICATE OF CORRECTION

PATENT NO. : 7,448,193 B2 Page 1 of 1
APPLICATION NO. : 11/877248
DATED : November 11, 2008
INVENTOR(S) : Harry L. Derby, V It is certified that error appears in the above-identified patent and that said Letters Patent is hereby corrected as shown below:

ON THE TITLE PAGE, Item (75), Inventor "Harry L. Derby" should be --Harry L. Derby, V--

Column 3, Line 47 (application page 7, line 3) insert --61-- after "bedknife"

Column 4, Line 1 (application page 7, line 21) "links 22 limit" should be --links, 22, 23 limit--

Column 4, Line 24 (application page 8, line 17) "links 22" should be --link 22--

Column 4, Line 44 (application page 9, line 10) "links 22" should be --link 22--

Signed and Sealed this

Twenty-third Day of June, 2009

JOHN DOLL
*Acting Director of the United States Patent and Trademark Office*